March 14, 1933. A. BRUNNER 1,901,143
HOSE FITTING
Filed March 8, 1930

Inventor
A. BRUNNER
By [signature]
Att'y.

Patented Mar. 14, 1933

1,901,143

UNITED STATES PATENT OFFICE

ALBERT BRUNNER, OF ST. LOUIS, MISSOURI, ASSIGNOR TO WAGNER ELECTRIC CORPORATION, OF ST. LOUIS, MISSOURI, A CORPORATION OF DELAWARE

HOSE FITTING

Application filed March 8, 1930. Serial No. 434,193.

My invention relates to a fitting or coupler member to be secured to the end of a hose embodying rubber or other compressible material, and to the method of securing it to the hose, the object of the invention being to form, in an economical manner, a connection between a hose and a fitting which will be not only mechanically secure but also fluid-tight under very high pressure.

Figure 1:
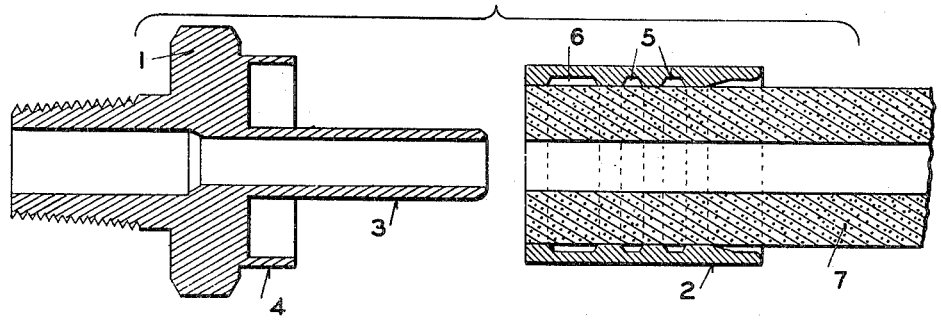
Figure 3:
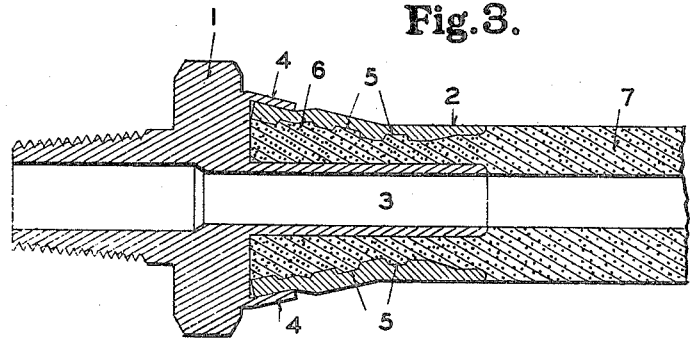
Figure 2:
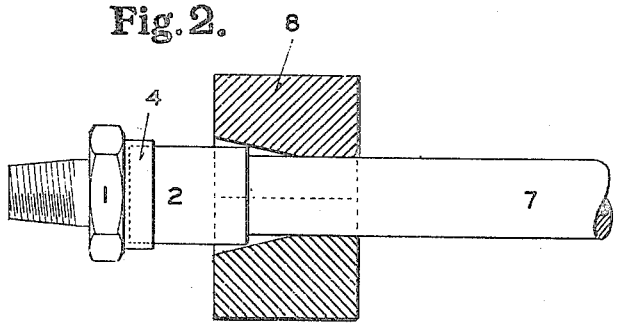

In the accompanying drawing Figure 1 illustrates, in cross section, the elements of my improved hose fitting as initially formed; Figure 2 illustrates the method and means for permanently securing the parts together; and Figure 3 is a cross-sectional view of the fitting and hose end in their final form.

My improved coupler comprises a main fitting member 1 and an unsplit metal sleeve 2. The member 1 comprises a wrench receiving body portion having a central integral tubular extension 3 and a short outer, cylindrical, thin-walled extension 4, also integral with said body portion. The outer end of the member 1 may be formed of an externally threaded member, as shown, to cooperate with an internally threaded socket in a complementary coupling element, or may be so dimensioned and internally threaded as to receive the end of a complementary coupling element.

The sleeve 2 is provided with internal corrugations or grooves 5 in any suitable manner, and preferably a relatively wide internal groove 6 is formed adjacent to the forward end of the sleeve to weaken the sleeve at that point.

To assemble the parts, the sleeve is placed over the hose end 7 in the position shown in Figure 1, and then the tubular nipple 3 of the main fitting member is inserted into the bore of the hose and the end of the hose and the end of the sleeve are brought against the side of the body portion of the fitting, the diameter of the sleeve being such that its end fits within the cylindrical extension 4 of the fitting. A two-part reducing die 8 is then placed around the hose, as illustrated in Figure 3, and the sleeve and the end fitting member are forced into the die, which operation reduces the diameter of the sleeve and compresses the resilient material of the hose between the sleeve and the nipple 3. As the parts pass into the die the resilient material of the hose "flows" forward to such an extent as to cause the portion of the hose material within the extension 4 to also be under high compression, the contact pressure between the hose and sleeve progressively increasing toward the outer end of the sleeve from a point near its inner end. The final portion of the movement of the fitting into the die bends the cylindrical extension over the forward end of the sleeve, as indicated in Figure 3. The outer end of extension 4 being opposite the weakened portion of the sleeve, that portion bends downwardly, as indicated, whereby the angle, of the tapered cooperating surfaces of the sleeve and extension to the axis of the fitting, is increased.

By the structure and method of assembling the parts described, the hose material is firmly compressed between the sleeve and the central tubular extension of the fitting body, not only at the reduced portion of the sleeve but between the forward end of the sleeve and said extension, thus forming a firm tapered end portion internally supporting the tapered end portion of the sleeve, whereby the fitting member cannot be withdrawn from the hose and sleeve except by such force as would enlarge the diameter of the compressed end of the clamping extension 4.

Tests of the construction described, and even with hose embodying a braided wire fabric, have demonstrated that longitudinal strains and internal pressure sufficient to break the hose do not produce separation of or leaks at the fitting.

Being aware of the possibility of modifications in the particular structure herein described without departing from the fundamental principles of my invention, I do not intend that its scope be limited except as set forth by the appended claim.

Having fully described my invention, what I claim as new and desire to secure by Letters Patent of the United States is:

The combination with a hose, of a fitting therefor comprising a body portion having a tubular part extending into the hose and an outer annular flange adapted to surround the hose end, the bore of the flange being so tapered that its diameter at the outer end is less than its diameter adjacent the body portion of the fitting, a sleeve surrounding the end of the hose and maintaining it in pressure engagement with the periphery of the tubular part, the inner end of said sleeve being rigid and having a conical exterior surface positioned within said annular flange and in contact with the inner surface thereof whereby longitudinal separation of the sleeve from the body member will be prevented.

In testimony whereof, I hereunto affix my signature, this 5th day of March, 1930.

ALBERT BRUNNER.